United States Patent [19]

Utaka et al.

[11] Patent Number: 4,874,216
[45] Date of Patent: Oct. 17, 1989

[54] VARIABLE-WAVEGUIDE OPTICAL BRANCHING FILTER

[75] Inventors: Katsuyuki Utaka, Musashino; Kazuo Sakai, Tokyo; Yuichi Matsushima, Tanashi; Shigeyuki Akiba, Tokyo, all of Japan

[73] Assignee: Kokusai Denshin Denwa Kabushiki Kaisha, Tokyo, Japan

[21] Appl. No.: 210,640

[22] Filed: Jun. 23, 1988

[30] Foreign Application Priority Data

Jul. 2, 1987 [JP] Japan .................................. 62-163901

[51] Int. Cl.⁴ ............................................... G02B 6/34
[52] U.S. Cl. ............................... 350/96.19; 350/96.13; 350/96.14
[58] Field of Search ....................... 350/3.6, 3.7, 96.11, 350/96.12, 96.13, 96.14, 96.15, 96.19, 96.34, 162.11, 162.17, 162.19, 162.2, 162.23, 311, 313

[56] References Cited

U.S. PATENT DOCUMENTS 4,673,241  6/1987  Nishiwaki et al. ............. 350/3.64
4,747,654  5/1988  Yi-Yan ........................... 350/96.19
4,750,801  6/1988  Alferness ....................... 350/96.12

Primary Examiner—Frank Gonzalez
Attorney, Agent, or Firm—Emmanuel J. Lobato; Robert E. Burns

[57] ABSTRACT

A variable-waveguide optical branching filter is disclosed, in which a diffraction grating is formed in the cross region of two crossing waveguides, only light of a particular wavelength which is determined by the period of the diffraction grating is branched to a desired one of the waveguides, and the refractive index of the cross region is changed by control of a voltage or a current, or by way of irradiation with light, thereby changing the wavelength of light to be branched.

7 Claims, 4 Drawing Sheets

VARIABLE-WAVEGUIDE OPTICAL BRANCHING FILTER

BACKGROUND OF THE INVENTION

The present invention relates to a variable-wavelength waveguide type optical branching filter capable of switching the propagation paths for an optical signal of a desired wavelength.

A wavelength division multiplexing (WDM) optical fiber transmission system is being investigated very actively because it will not only afford a substantial increase in the capacity of a basic transmission line but also its flexibility can offer various services at different bands such as telephone, high-speed data and video information in a subscriber's system, in particular, in a local area network (LAN). The WDM system is intended primarily for multiplexing by propagating optical signals of plural wavelengths over one transmission line, and the development of an optical branching filter of low loss and small crosstalk is indispensable to this system since it is necessary to join or branch wavelengths carrying desired signals in the transmission line at a desired place or places. In conventional systems the number of services rendered is very small and only several wavelengths are used. Accordingly, respective channels are spaced more than 200 Å apart in wavelength and conventional optical branching filters are mainly those mode of the interference film which are relatively wide in band.

With the expansion of service contents, the number of channels needed will be increased in the future and the channel spacing will have to be reduced accordingly. This will call for the use of many optical branching filters of narrow band. A waveguide type optical branching filter is suitable for efficient joining and branching many channels and for providing the device in compact form. Furthermore, the waveguide type optical branching filter, if formed using a semiconductor, could be integrated with a light source such as a semiconductor laser, or an optical active element such as a photodetector. In addition, if the center wavelength of the optical branching filter can be varied by an external control signal, it will be possible not only to enhance the performance of the element but also to implement a novel function.

In order to control the center wavelength of the optical branching filter, prior art employs the surface acoustic wave. However, prior art does not provide high efficiency diffraction, adversely affects the reliability of the device and presents a very low response speed.

SUMMARY OF THE INVENTION

It is therefore an object of the present invention to provide a variable wavelength optical branching filter which is capable of rapidly switching the propagation path of an optical signal of a desired wavelength.

According to the present invention, a diffraction grating is formed in the cross region of two crossing waveguides, only light of a particular wavelength which is determined by the period of the diffraction grating is branched to a desired one of the waveguides, and the refractive index of the cross region is changed by control of a voltage or a current, or by way of irradiation with light, thereby changing the wavelength of light to be branched.

BRIEF DESCRIPTION OF THE DRAWINGS

The present invention will be described in detail below in comparison with prior art with reference to the accompanying drawings, in which.

DETAILED DESCRIPTION

To make differences between prior art and the present invention clear, an example of prior art will first be described.

Figure 1:
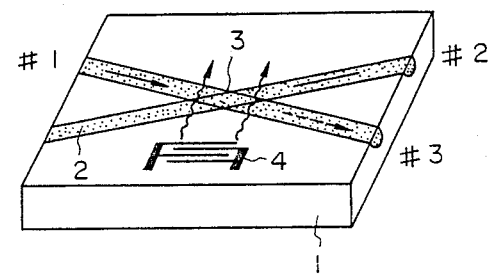
FIG. 1 is a schematic diagram of a prior art example of a waveguide type optical branching filter using LiNbO$_3$.

The variable wavelength waveguide type optical branching filter reported so far is formed of LiNbO$_3$ which is a ferrodielectric material. FIG. 1 shows an example of the filter. Reference numeral 1 indicates a Y-cut LiNbO$_3$ substrate, which has a cross-type waveguide 2 formed by diffusing Ti therein as indicated by dots. A cross region 3 has its refractive index modulated by virtue of the photoelastic effect of LiNbO$_3$ since a surface acoustic wave (SAW) is being excited in the region 3 through a transducer 4. Of rays of light incident to a waveguide #1, only light of a particular wavelength specified by the SAW wavelength is coupled to a waveguide #2 through diffraction and the rays of light of the other wavelengths are propagated at their intact condition and provided from a waveguide #3. Since the SAW wavelength is varied continuously by changing the frequency of an input signal of the transducer 4, the wavelength of light to be diffracted is also varied.

As described above, the prior art example employs the surface acoustic wave for diffracting light of a particular wavelength, but this structure does not provide high efficiency diffraction for the materials, such as semiconductors with less photoelastic effect, adversely affects the reliability of the device and presents a very low response speed.

With reference to the accompanying drawings, the present invention will hereinafter be described in detail.

1st Embodiment

Figure 2A:
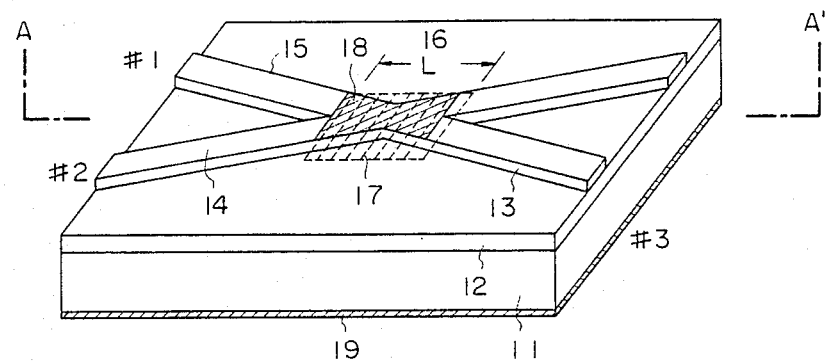
FIGS. 2A and 2B are a schematic diagram and a side view of a wavelength-variable optical branching filter of the present invention which uses InGaAsP/InP.
Figure 2B:
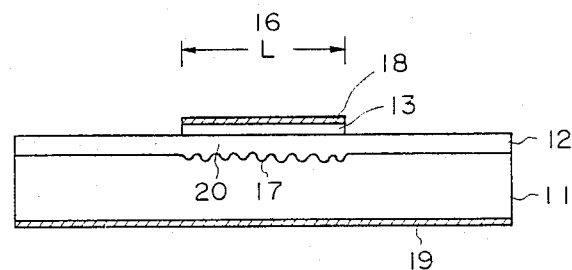

FIGS. 2A and 2B illustrate a first embodiment of the present invention, FIG. 2A being its schematic diagram and FIG. 2B its side view. This embodiment uses a semiconductor material such as InGaAsP.

In FIGS. 2A and 2B, reference numeral 11 indicates an n-InP substrate, 12 an InGaAsP waveguide layer, and 13 a p-InP layer which is shown to have ridge structure which guides light under its stripe pattern alone. The ridge structure is obtained by selectively etching away the P-InP layer 13 formed over the layer 12. Two ridge waveguides 14 and 15 cross each other as shown and under their cross region (of a length L) 16 there is formed a diffraction grating along the waveguide layer 12 symmetrically with respect to the waveguides 14 and 15, as indicated by the broken lines. The surface of the cross region 16 and the underside of the substrate are deposited over the entire areas thereof with a p-side and n-side electrodes 18 and 19, respectively. When applying a forward or reverse bias, carriers are injected into or an electric field is applied to a waveguide layer 20 (the waveguide layer 12 underlying the cross region 16), changing its refractive index.

Figure 3:
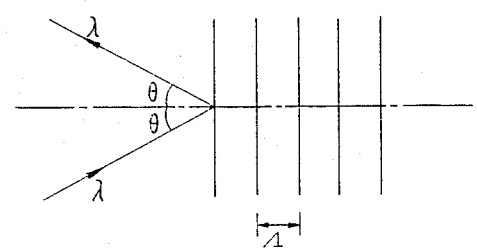
FIG. 3 is a diagram explanatory of the basic operation of the present invention.

Now, the principle of operation of this device will be described with reference to FIG. 3. Of rays of light incident to the diffraction grating 17 having a period $\Lambda$ at such an angle $\theta$ as indicated by the arrow, only light in the vicinity of a wavelength which satisfies a condition, $\lambda = 2n\Lambda\cos\theta$, is selectively diffracted at the same angle $\theta$ as the incident angle. In the above n is the refractive index of the waveguide layer 20. That is, when light is incident to the diffraction grating from the waveguide #1 in FIG. 2A, only light within a limited range of wavelengths centering about the wavelength given by the above-mentioned equation is led out of the waveguide #2, and light of the other wavelengths travels straight in the cross region 16 and emitted from the waveguide #3. Accordingly, this device can be employed as a waveguide type optical branching filter having a wavelength selectivity function. For example, if the angle of intersection of the waveguides is selected such that $2\theta = 4°$, then light in a 1.5 $\mu$m band can be branched by setting the period $\Lambda$ of the diffraction grating to about 2300 Å since the refractive index n of the InGaAsP is around 3.3. In this instance, the range of the wavelength selected is of 40 Å or so. Moreover, according to this embodiment, since the refractive index of the InGaAsP waveguide layer 20 can be changed by applying thereto a current or voltage thereto via the electrodes 18 and 19, the center wavelength for branching is variable. Incidentally, it is expected that the center wavelength could be changed approximately with a range of about 90 Å, because the refractive index can be changed in the range of $\Delta n$ to 0.02.

2nd Embodiment

Figure 4:
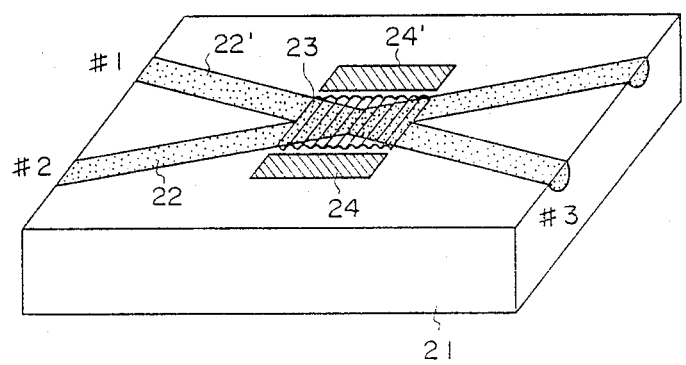
FIG. 4 is a schematic diagram of an optical branching filter of the present invention which uses LiNbO$_3$.

FIG. 4 schematically illustrates a second embodiment of the present invention, which uses LiNbO$_3$ which is a ferrodielectric material. Reference numeral 21 identifies a Y-cut LiNbO$_3$ substrate, which has intersecting waveguides 22 and 22' formed by diffusing titanium (Ti) therein. Reference numeral 23 designates a diffraction grating formed in the region where the waveguides cross each other. Electrodes 24 and 24' for voltage application are provided at both sides of the diffraction grating 23 in opposing relation thereacross. The manner in which light is branched is exactly the same as in the 1st Embodiment. Of incident light to the diffraction grating from the waveguide #1, only light of a specific wavelength is branched into the waveguide #2. Since the refractive index n of the LiNbO$_3$ is approximately equal to 2.3, the period $\Lambda$ of the diffraction grating 23 needed for 1.5 $\mu$m wavelength is $\sim$3300 Å. By voltage application across the electrodes 24 and 24', an electric field is applied to the diffraction grating 23, changing its refractive index by virtue of the electrooptic effect. The refractive index change $\Delta n$ is estimated to be a maximum of about 0.005 though it depends on the applied voltage and the electrode spacing, and accordingly the center wavelength for branching can be varied over a range of about 60 Å. While this embodiment employs the Y-cut LiNbO$_3$ substrate, it is also possible, of course, to use a Z-cut configuration with a different electrode arrangement, and this embodiment is not limited specifically to the LiNbO$_3$ but can also be implemented using other ferrodielectric materials.

3rd Embodiment

Figure 5:
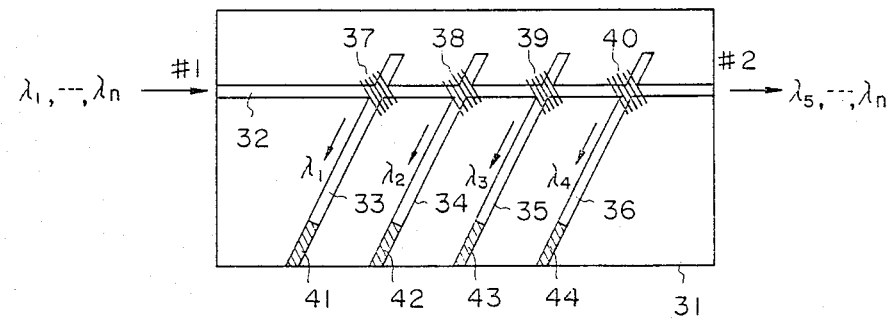
FIG. 5 is a schematic diagram of an element formed by integrating the optical branching filters of the present invention.

FIG. 5 illustrates an embodiment of the optical branching filter of the present invention as being applied to a receiver for wavelength multiplexing communication. Reference numeral 31 indicates a wafer formed of a semiconductor of InGaAsP/InP series, on which waveguides 32, 33, 34, 35 and 36 are formed as shown. Diffraction gratings 37, 38, 39 and 40 of the optical branching filter according to the present invention are disposed in the intersecting portions of the respective waveguides. Reference numerals 41, 42, 43 and 44 designate monolithically formed InGaAs photodiodes. Wavelength-multiplexed signal light enters from the waveguide #1 and light of a desired wavelength is picked up by each of the branching filters 37 to 40 and detected independently. On the other hand, the signal light of wavelengths unnecessary for these nodes travels straight in the waveguide #2, from which it is further propagated in an optical fiber. Since the center wavelength of each branching filter can be changed by changing its refractive index through carrier injection or electric field application as in the 1st Embodiment, the device can be used with a high degree of freedom. It is also possible to branch the thus obtained light of a specific wavelength to a different optical fiber without being detected.

4th Embodiment

Figure 6A:
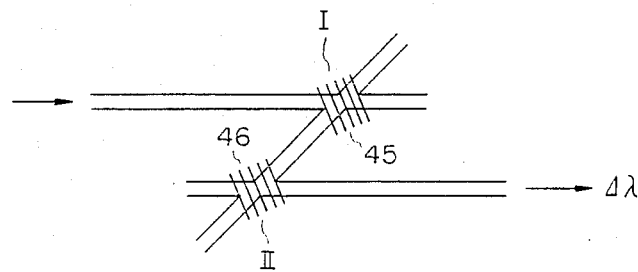
FIGS. 6A and 6B are schematic diagram and a wavelength selection characteristic diagram of another optical branching filter of the present invention.
Figure 6B:
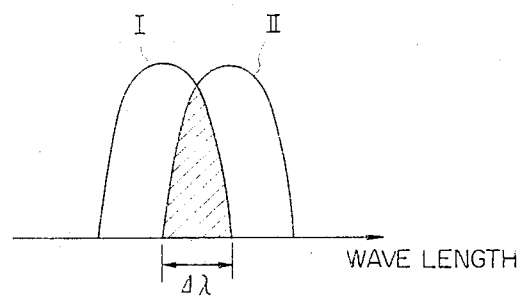

FIG. 6 is a schematic diagram of a multi-stage optical branching filter according to the present invention, in which optical branching filters I and II are connected in a plurality of stages (in two stages, in this example).

This embodiment has a structure in which diffraction gratings 45 and 46 of the optical branching filters I and II differ from each other in the period $\Lambda$ and hence have different center wavelengths. Accordingly, the wavelength of light which is taken out by the both optical branching filters I and II is a wavelength $\Delta\lambda$ indicated by hatching in FIG. 6B. The range of wavelength selection can also be narrowed by such a multi-stage connection of optical branching filters with spaced center wavelengths.

Although in the above the present invention has been described in connection with the case where InGaAsP is used as the semiconductor material, the invention is not limited specifically thereto but may also be applied to other materials such as AlGaAs/GaAs and InGaAs/InAlAs. Furthermore, a large refractive index change can effectively be obtained by forming a multiple quantum well as the waveguide layer in the cross region. The waveguide structure is not limited specifically to the ridge structure described in the embodiments but may also be an embedded structure and so on. Moreover, by disposing a multiple quantum well structure and other nonlinear material in the cross region, the refractive index of the diffraction grating can be changed by light irradiation so that the center wavelength of the optical branching filter can be changed accordingly.

As described above, the optical branching filter of the present invention, which has a diffraction grating in the intersecting region of two intersecting waveguide and changes the branching wavelength by changing the refractive index of the intersecting region, is higher in the degree of freedom in use and capable of changing the refractive index with high speed. Accordingly, the optical branching filter of the present invention can be employed as a high-speed external modulating element or optical branching filter of a variable branching ratio. Furthermore, a single-wavelength laser with a long cavity can be obtained by incorporating the optical branching filter into a semiconductor laser. Thus the present invention can implement elements of various functions, and hence is of great utility in practical use.

What we claim is:

1. A variable-wavelength optical branching filter, comprising: two optical waveguides intersecting each other at a predetermined angle, one of the two optical waveguides being employed in use as an input side waveguide for propaging therein incident light, the other of the two optical waveguides being employed as an output side waveguide for obtaining therefrom output light;

a material having a refractive index variable in response to application of input energy to the same and disposed at an intersection of the two optical waveguides;

means for applying said input energy to said material to produce the output light at the output side waveguide;

and a diffraction grating disposed at the intersection of the two optical waveguides for specifying a particular wavelength of the output light by the period of the diffraction grating, and the specified wavelength being variable by changing the refractive index of said material.

2. A variable-wavelength optical branching filter according to claim 1 in which means for applying said input energy is means for applying an electric current.

3. A variable-wavelength optical branching filter according to claim 1 in which said means for applying input energy is means for applying an electric voltage.

4. A variable-waveguide optical branching filter according to claim 1 in which said means for applying input energy is means for applying light.

5. A variable-wavelength optical branching filter according to claim 1 in which said material having a refractive index variable in response to application of input energy is a semiconductor.

6. A variable-wavelength optical branching filter according to claim 1 in which said material having a refractive index variable in response to application of input energy is a ferrodielectric material.

7. In combination a plurality of variable-wavelength optical branching filters, each variable-wavelength optical branching filter, comprising:

two optical waveguides intersecting each other at a predetermined angle, one of the two optical waveguides being employed in use as an input side waveguide for propaging therein incident light, the other of the two optical waveguides being employed as an output side waveguide for obtaining therefrom output light;

a material having a refractive index variable in response to application of input energy to the same and disposed at an intersection of the two optical waveguides;

means for applying said input energy to said material to produce output light at the output side of waveguide;

a diffraction grating disposed at the intersection of the two optical waveguides for specifying a particular wavelength of the output light by the period of the diffraction grating, and the specified wavelength being variable by changing the refractive index of said material, and the respective wavelengths of successive two of the variable-wavelength optical branching filters differ from each other.

* * * * *